United States Patent [19]
Cieplak

[11] Patent Number: 5,845,772
[45] Date of Patent: Dec. 8, 1998

[54] DEVICE FOR SECURE STORAGE OF COMPUTER DISKETTES

[76] Inventor: Stanley M. Cieplak, 1305 Mill Creek Rd., Fallston, Md. 21047

[21] Appl. No.: 587,479

[22] Filed: Jan. 17, 1996

[51] Int. Cl.[6] .................................................. B65D 27/16
[52] U.S. Cl. ........................... 206/308.3; 40/404; 40/405; 229/67.1; 229/74
[58] Field of Search .................................. 229/67.1, 67.2, 229/67.3, 67.4, 74; 402/73, 4, 75; 206/306.3, 425; 40/404, 405

[56] References Cited

U.S. PATENT DOCUMENTS

| | | | |
|---|---|---|---|
| 671,968 | 4/1901 | Kittredge | 229/67.1 |
| 673,387 | 5/1901 | Dean | 229/67.2 |
| 4,485,962 | 12/1984 | Farley | 229/67.1 |
| 4,549,658 | 10/1985 | Sfikas | 383/5 |
| 4,852,740 | 8/1989 | Sellar et al. | 206/308.3 |
| 4,884,691 | 12/1989 | Behrens et al. | 206/425 |
| 5,031,772 | 7/1991 | Woodriff | 229/67.1 |
| 5,042,841 | 8/1991 | Friedman | 402/75 |
| 5,275,438 | 1/1994 | Struhl | 229/67.1 |
| 5,579,908 | 12/1996 | Johnson | 206/813 |

FOREIGN PATENT DOCUMENTS

| | | | |
|---|---|---|---|
| 754946 | 11/1933 | France | 40/404 |
| 299281 | 7/1932 | Italy | 40/405 |
| 2200080 | 7/1988 | United Kingdom | 206/308.3 |

OTHER PUBLICATIONS

ACCO USA, Computer Accessories Fact Book; Jul. 1993, pp. 14 and 15.

*Primary Examiner*—Stephen P. Garbe
*Attorney, Agent, or Firm*—Shanks & Herbert

[57] ABSTRACT

A device for the secure storage of computer diskettes includes a pocket closed on three sides and a flap releasably closing the fourth side of the pocket to securely retain the diskette within the pocket. The pocket device also includes retaining devices to fixedly or releasably retain the pocket in a document or file folder.

16 Claims, 6 Drawing Sheets

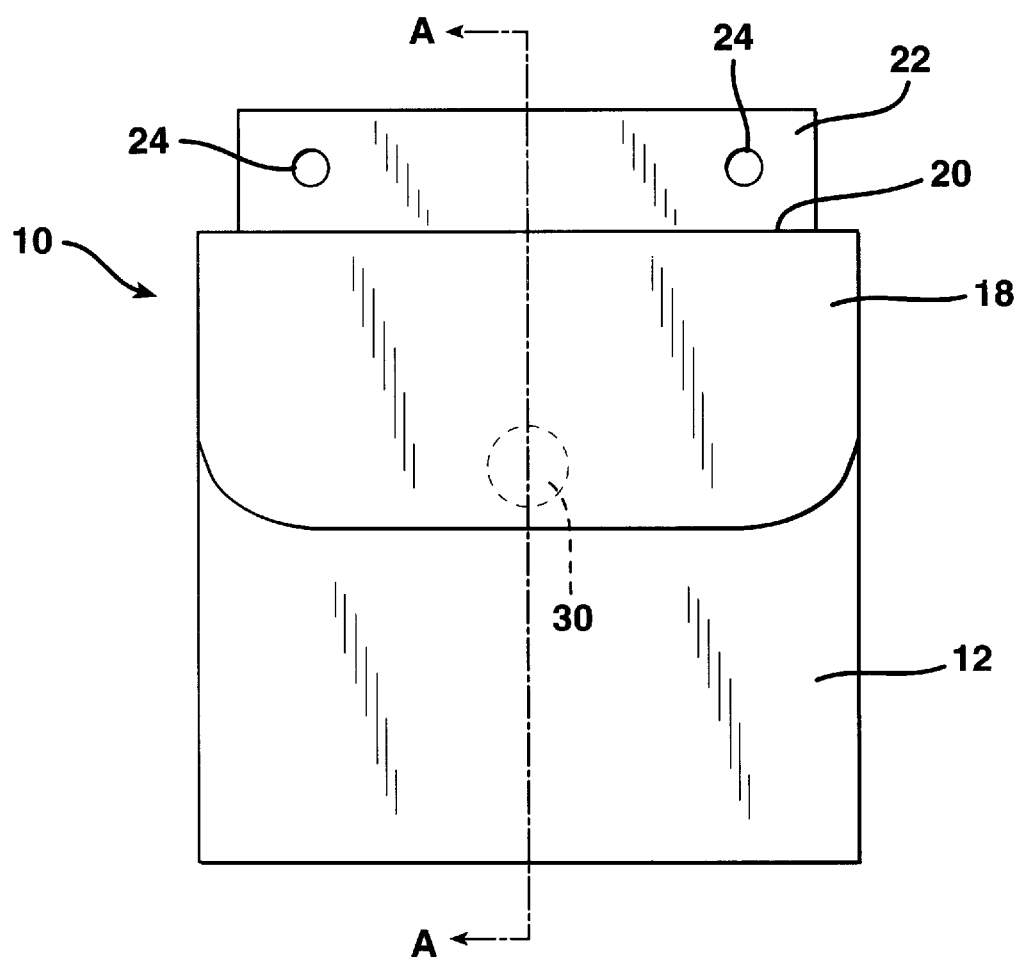

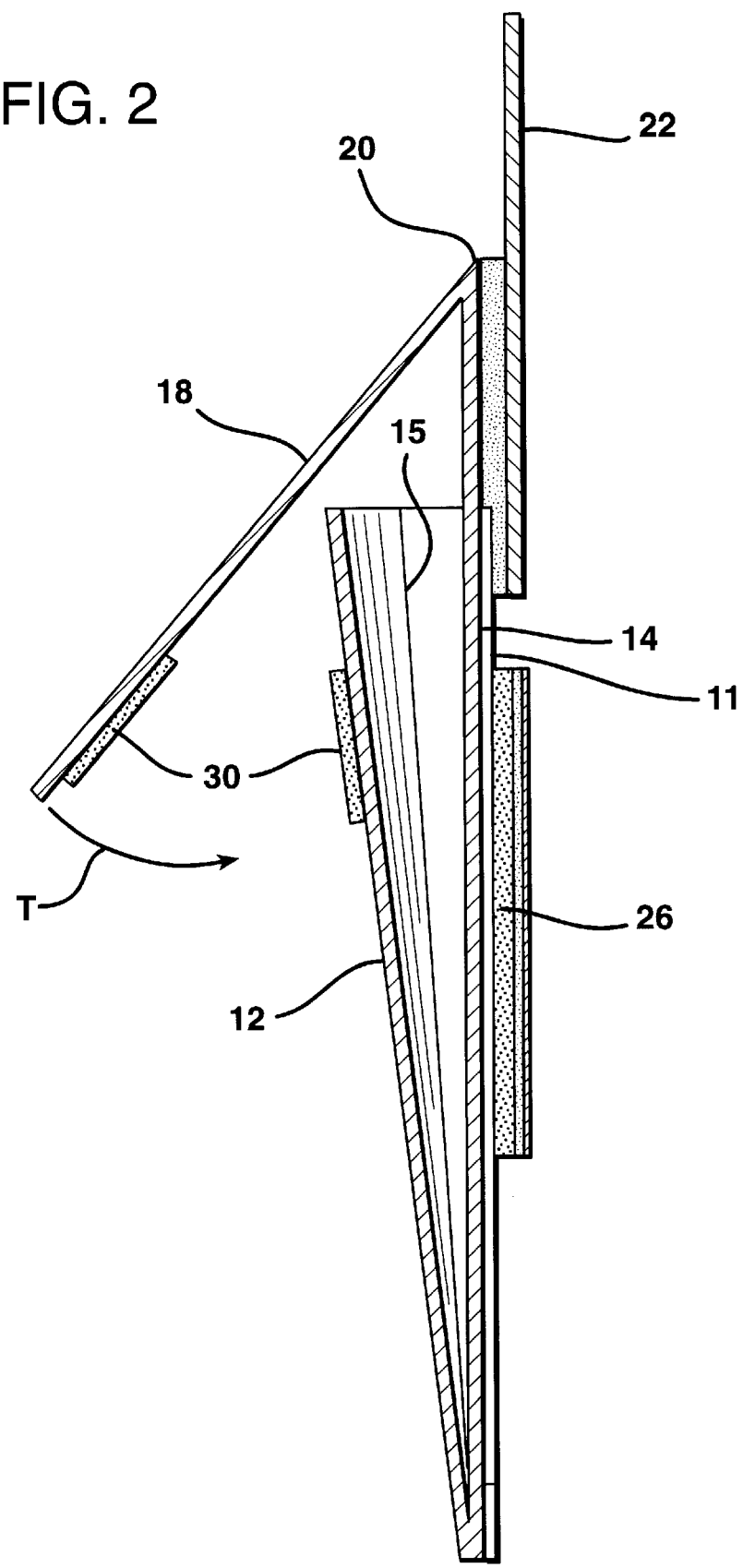

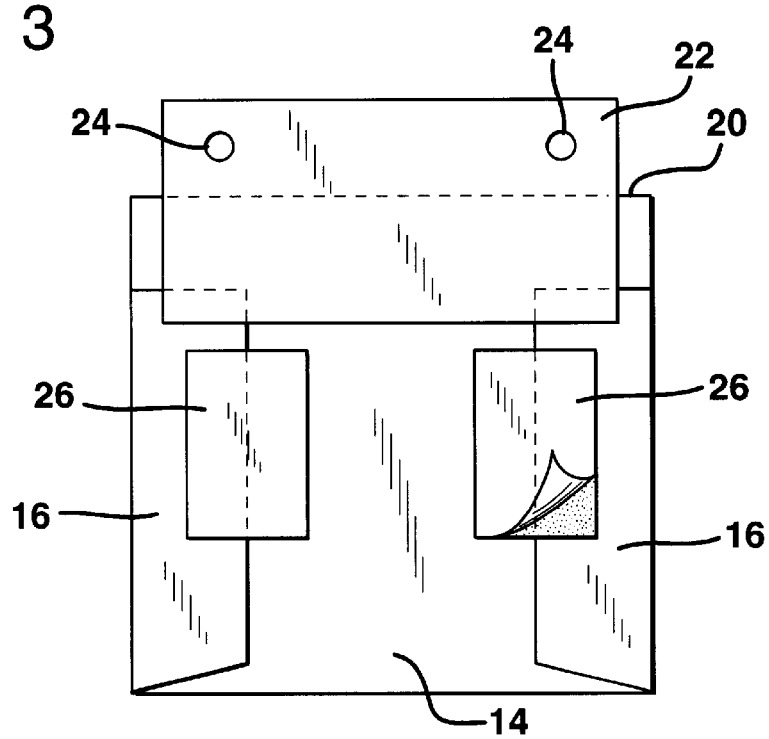
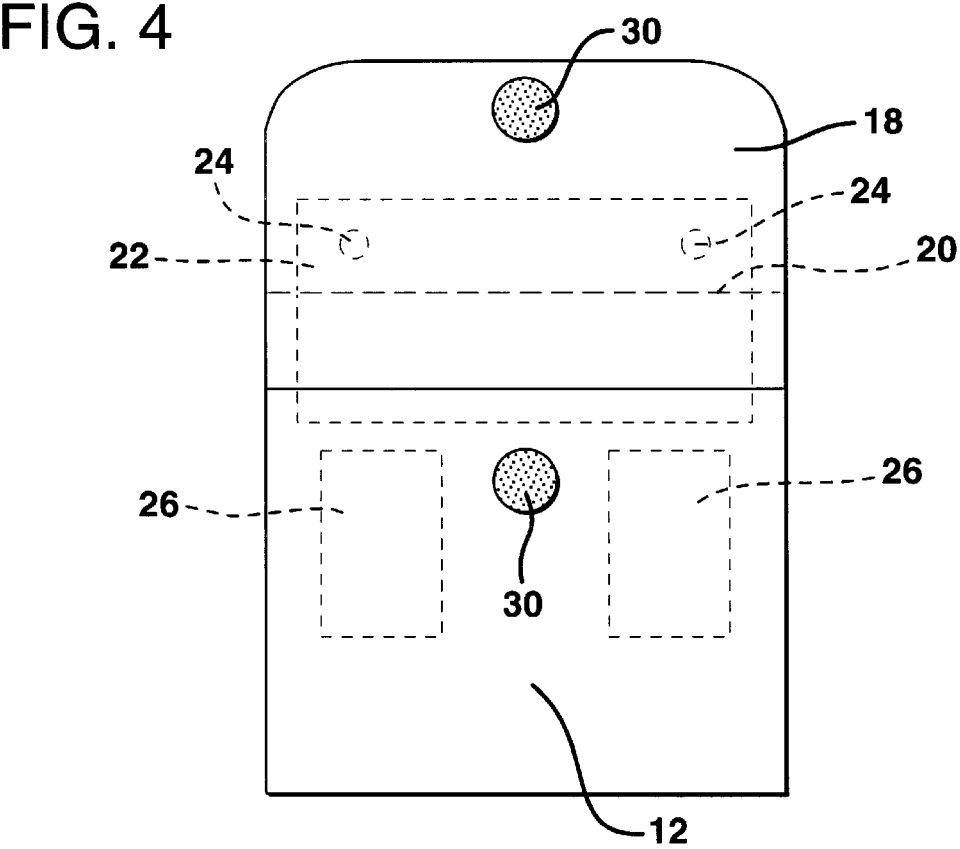

DEVICE FOR SECURE STORAGE OF COMPUTER DISKETTES

BACKGROUND OF THE INVENTION

1. Field of the Invention

The present invention relates to a device for the storage of computer diskettes. More particularly, the present invention relates to a device for the storage of computer diskettes in various types of binders and office files in a secure manner preventing the diskette from falling out of the file or binder and being lost.

2. Description of the Related Art

A number of different devices are used to store computer diskettes. Some examples of these devices include open ended pockets or sleeve type holders which fit into three ring binders or hang in standard hanging files. Other methods for diskette storage consist of separate file boxes designed to hold the diskettes. Each of these methods has a number of shortcomings.

In a typical device for storing computer diskettes within files, the holder consists of nothing more than an open pocket or sleeve into which the diskette is slid. The diskette is usually held in place by nothing more than a snug fit within the pocket. This results in a number of problems. For some users the snugness of the pocket creates a dexterity problem when inserting and removing the diskette. There is also the problem that after continued use the pocket stretches allowing the diskette to fall more easily from the holder. Additionally, all holders with an open end have the limitation that the diskette may fall out and be lost from the file at any time.

When the typical desktop file holder for computer diskettes is used, there is the problem that the diskette is not kept with the corresponding file. This separation from the working file results in diskettes eventually being permanently lost from files and ultimately duplication of efforts.

In light of the foregoing, there is a need in the art for a device for securely storing computer diskettes with corresponding working files.

SUMMARY OF THE INVENTION

Accordingly, the present invention is directed to a device for storing a computer diskette that substantially obviates one or more of the limitations of the related art.

In addition, the invention is directed to a device which may be used in any type of file or document holder. In one aspect the device is detachable and transferable from file to file and as such is reusable apart from a particular file or document folder; in another aspect, the device may be permanently mounted to the file or document folder.

Moreover, the device is directed to a device for storing the computer diskettes that prevents loss of the diskettes from the file.

To achieve these and other advantages and in accordance with the purpose of the invention, as embodied and broadly described herein, the invention includes a device for storage of a computer diskette within any type of file. The device comprises a pocket for storing a data storage disk in a document folder. The pocket comprises a front wall; a rear wall having a bottom edge connected to a bottom edge of the front wall so that an inner surface of the front wall and an inner surface of the rear wall form the pocket for the disk. Further, a pair of side wings or walls, each connecting one of a pair of side edges of the first wall to a respective one of a pair of side edges of the second wall thus seal the sides of the pocket, leaving only the top open. A flap is hingedly connected to a top edge of the rear wall, the flap being movable from an open position allowing the disk to be inserted in the pocket through the open top formed between the top edge of the rear wall and a top edge of the front wall and a closed position at least partially covering the opening; at least one fastener disposed on at least one of the flap and the front wall for releasably securing the flap in the closed position. Further, at least one retainer is disposed on the rear wall, the retainer allowing the pocket to be retained in the document folder such that the disk may be stored along with documents in the document folder.

Additionally, the present invention includes a pocket for holding a diskette having a retaining system, wherein at least one retainer includes adhesive material disposed on the rear wall for permanently attaching the pocket to a document holder, and a tab attached to the rear wall, the tab having at least one hole for releasably securing the pocket to the document folder with a clasp, including but not limited to prong fasteners ordinarily utilized to secure documents only. Also, a hook and loop fastener system may be used to releasably attach the pocket to a file folder.

To achieve these and other advantages in another aspect, the device comprises a pocket for storing a data storage disk in a document or file folder, comprising a front wall; a pair of side wings or walls each connecting one of a pair of side edges of the front wall and for mounting to a respective surface area on a document or file folder; a bottom wing/wall connecting to the bottom edge of the front wall and for mounting to a respective surface area on a document or file folder; (in this aspect, a rear wall for the pocket will be achieved upon mounting of the device to the document or file folder by utilizing the structure of the document or file folder on which the device is to be mounted as the device's permanent rear wall and having a bottom edge for the device connected to a bottom edge of the front wall and also to a respective surface area of the document or file folder so that an inner surface of the front wall and the surface of the document folder on which the device is mounted thereby creates a rear wall for the device and forms an interior pocket for the disk; a separate flap to be mounted on the surface of the document folder hingedly connected proximate to a top edge of the front wall of the device, the flap being moveable from an open position allowing the disk to be inserted in the pocket through an opening formed below the flap and between the rear wall and a top edge of the front wall and a closed position at least partially covering the opening; at least one fastener disposed on at least one of the flap and the front wall for fastening the flap in a closed position; once the flap, side wings or walls and bottom wing or wall being secured directly to the surface of the document folder or file will create a retainer allowing the pocket to be retained in the document folder such that the disk may be stored along with documents in the document folder.

In another aspect, the pocket of the device is constructed wherein each of the side wings or walls include at least one pleat to accommodate movement of the first and second walls away from one another during insertion or removal of the disk through the opening. Further, the side walls may be pliant or of a fibrous material to aid in opening the pocket for insertion or removal of a diskette.

In a further aspect, the pocket of the storing device includes at least one fastener of the hook and loop type or of a string and button type to thus releasably hold the flap closed against the front wall. Furthermore, the releasable fastener may use a reusable adhesive on one of the flap or front wall and a smooth and non-porous surface on the other.

It is understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings, FIG. 1 is a front view of the diskette holder.

FIG. 2 is a side view.

FIG. 3 is a view of the back of the holder.

FIG. 4 is a front view similar to FIG. 1 with the flap in a blank form to receive the diskette.

DETAILED DESCRIPTION

Figure 5:
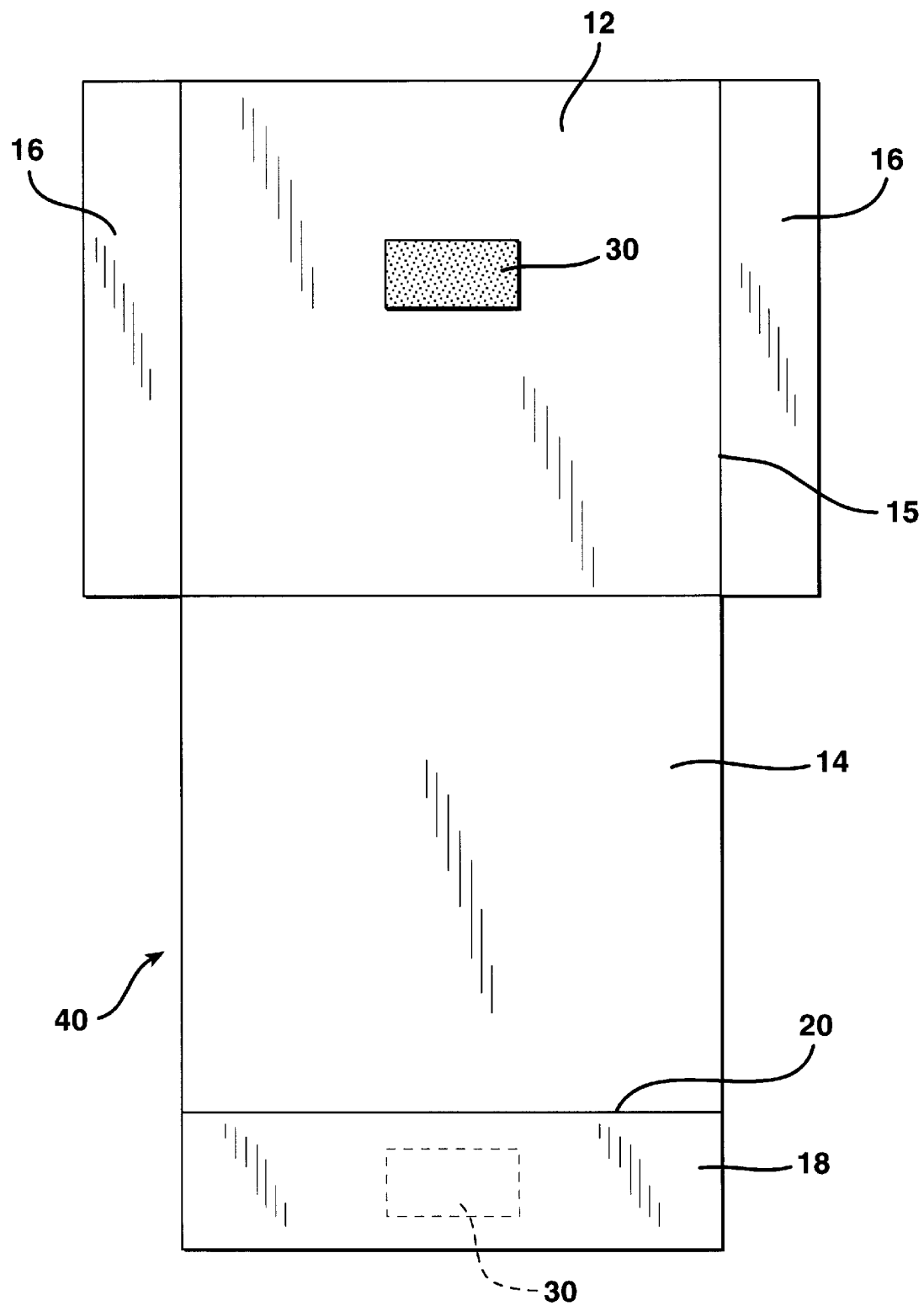
FIG. 5 is a view of a blank to be used to construct the pocket.

Reference will now be made in detail to the present preferred embodiments of the invention, an example of which is illustrated in the accompanying drawings.

In FIG. 1, there is provided a device 10 for the secure storage of computer diskettes. More particularly, the device includes a pocket 11 (see FIG. 2) for holding a data storage disk in a document folder. The device 10 comprises a front wall 12; and a rear wall 14 each having their bottom edges connected so that an inner surface of the front wall and an inner surface of the rear wall form interior pocket 11 for storage of the disk. A pair of side wings or walls 16 (see FIG. 3) are provided to connect one of a pair of side edges of the first wall, either the front or rear wall, to a respective one of a pair of side edges of the second wall, the other of the front or rear wall; thus, pocket 11 is open only along the top edge (see FIG. 2).

A flap 18 is hingedly connected to the top edge of the rear wall at 20, the flap being movable from an open position (FIG. 5) allowing the disk to be inserted in the pocket through an opening formed between the rear wall and a top edge of the front wall and a closed position (see arrow T, FIG. 2) at least partially covering the opening. At least one fastener, for example, hook and loop fastener 30, is disposed on at least one of the flap and the front wall for releasably fastening the flap in the closed position.

At least one retainer element 22 is disposed on the rear wall of the holder using an attachment element 23, such as adhesive; the retainer allowing the pocket to be releasably retained in the document folder such that the disk may be stored along with documents in the document folder. The retainer may be provided with holes 24 to mate with prongs or a clasp (not shown) attached to the document folder. Alternatively, hook and loop fasteners, one on the holder rear wall and one on the document folder, may be used as the releasable retainer.

Also, a second retainer 26 may be provided on the rear wall 14 to permanently attach the storage device 10 to a folder. Specifically, adhesive pads 26 are attached to the rear wall 14. The pads 26 include removable strips, which when removed therefrom expose an adhesive surface which will serve to permanently attach the storage device 10 to a folder.

Thus, the storage device 10 is preferably provided with two retaining systems to allow the user thereof to removably or permanently attach the device 10 to a folder. However, the holder may be provided with one or the other of the retainers described above.

The device described above may be made from a single piece or blank 40 of material (see FIG. 5) and does not require a significant amount of time for manufacturing and construction. In addition, the use of a single piece or blank of material results in minimum waste and quick assembly. The retainers 22 and 26 are added after the blank is folded to form the releasably closable pocket.

Figure 6:
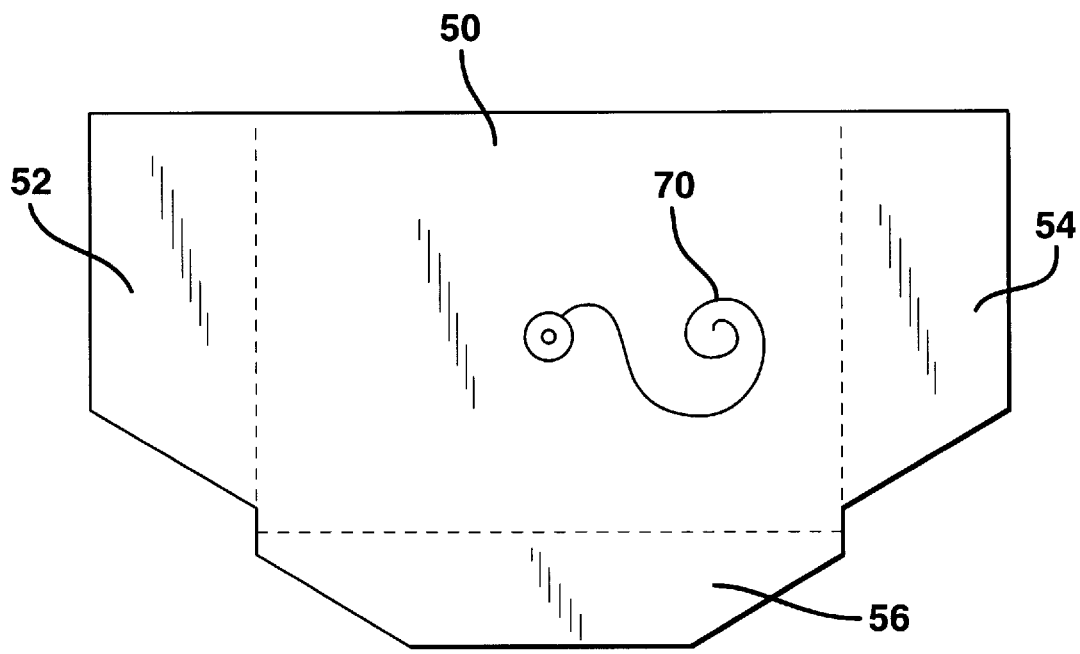
FIG. 6 is a partial view of a second embodiment.
Figure 7:
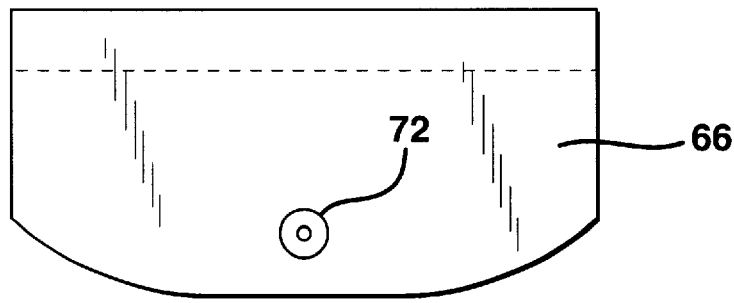
FIG. 7 is a view of the flap used in the second embodiment.
Figure 8:
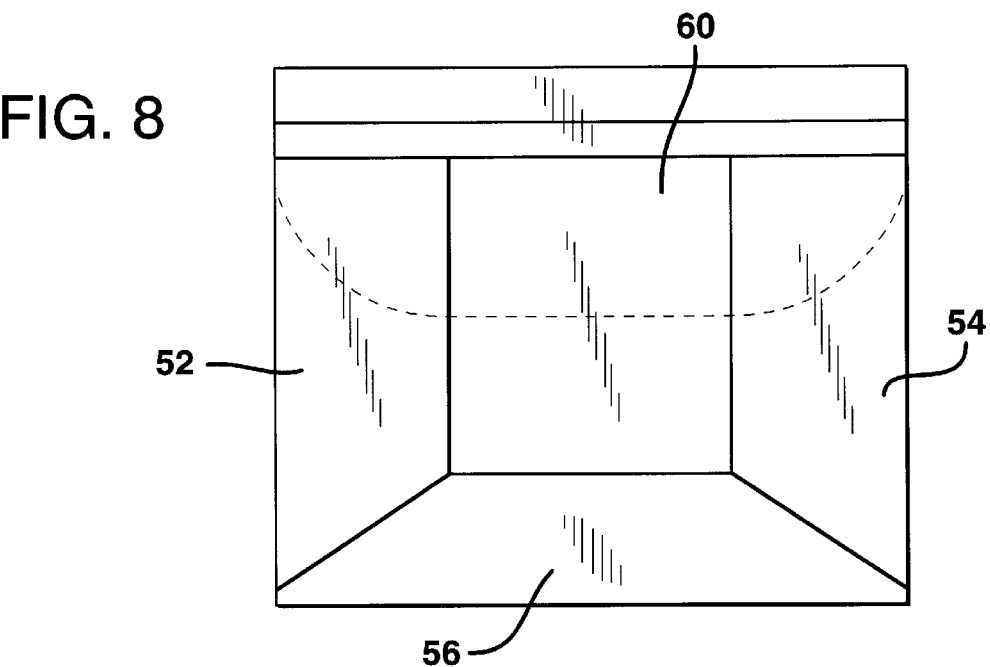
FIG. 8 is a back view of the second embodiment.

Alternatively, the diskette holder may be assembled from a plurality of parts or pieces as shown in FIGS. 6–9. For example, FIG. 6 shows a front panel 50 with three wings 52, 54 and 56 to be folded as shown in FIG. 8 and attached to a file folder.

FIG. 7 shows a flap 66 which is to be attached to a file folder to be above the front panel 50 to thus fall over the front panel 50. Thus, the embodiment of FIGS. 6–9 comprises a first part 50 that is directly attached to a document or file folder, whereby the folder serves as the rear wall of the pocket. The flap is likewise secured to the folder, spaced above the first part 50 to releasably close the pocket as discussed hereinabove.

Figure 9:
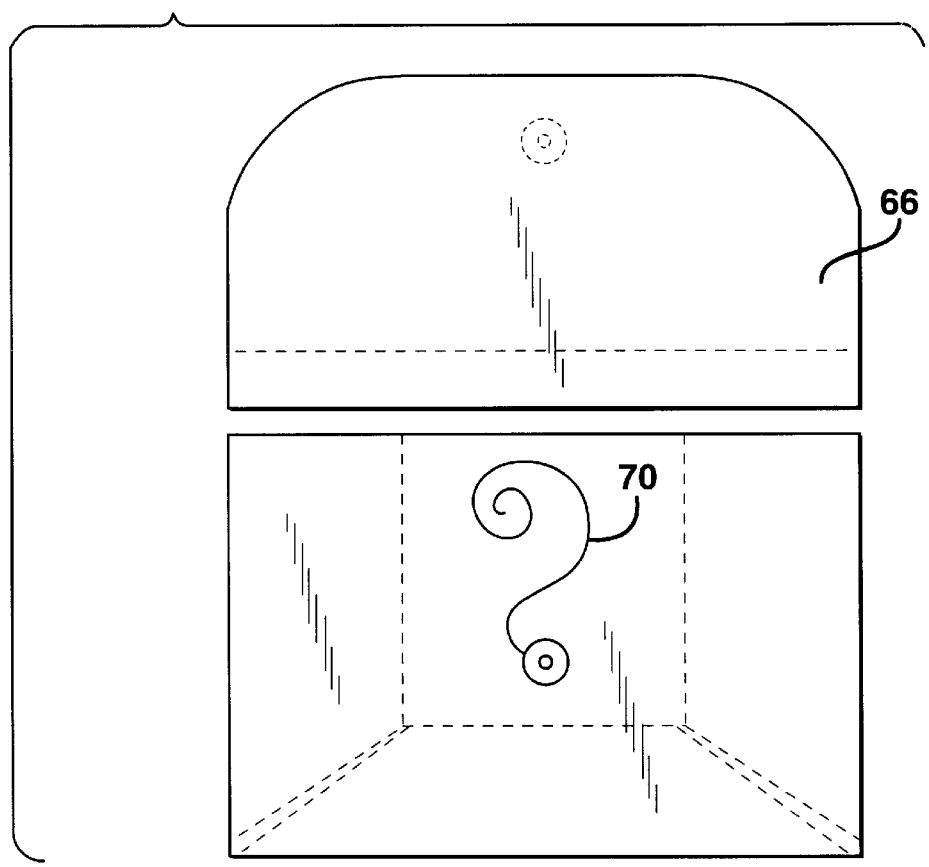
FIG. 9 is a front view of the second embodiment ready for attachment to a document or file folder.

FIGS. 6, 7 and 9 also show an alternative flap securing device that can be used to hold diskettes within the pocket. As shown herein, the securing device is of the post and string type with a string 70 attached to either the flap or front panel and a post 72 to wrap the string around attached to the other of the flap or front panel.

Other securing devices may be used to keep the flap secured to the front panel, such as a releasable and reusable adhesive strip as found on the ubiquitous colored sticky notes. The particular fastener used is not critical and each of those mentioned hereinabove is well known. What is critical, however, is that the fastener be reusable to the extent that it can be opened and resealed as desired.

The materials of either of the pockets discussed above may be selected from such diverse categories as card stock and fabric. Moreover, the sidewalls of the pocket may have a pleat (see 15 in FIG. 2) to allow the pocket to open somewhat wider or expand than without the pleat. Further, the front wall and the rear wall may be attached to each other using separate pliant material or fabric to permit for expansion when the pocket is opened.

It is claimed:

1. A device for storing a data storage disk in a document or file folder, comprising:

a front wall;

a rear wall having a bottom edge connected to a bottom edge of the front wall so that an inner surface of the front wall and an inner surface of the rear wall form a pocket for the disk;

a pair of side walls, each connecting one of a pair of side edges of the first wall to a respective one of a pair of side edges of the second wall, thus enclosing said pocket on three sides;

a flap connected to a top edge of the rear wall, the flap being movable from an open position allowing the disk to be inserted in the pocket through an opening formed between the top edge of the rear wall and a top edge of the front wall and a closed position at least partially covering said opening;

means for fastening disposed on at least one of the flap and the front wall for fastening the flap in the closed position;

means for retaining said pocket in a document or file folder disposed on said rear wall, said means for retaining including a first means to permanently retain said pocket in a document or file folder and second means for releasably retaining said pocket in a document or file folder.

2. The device of claim 1, wherein said side walls comprise pliant or fibrous material that are attached to the edges of the front wall and the rear wall.

3. The device of claim 1, wherein each of the side walls includes at least one pleat so as to allow movement of the first and second walls away from one another during insertion or removal of the disk through the opening.

4. The device of claim 1, wherein said means for fastening said flap in said closed position is selected from the group consisting of a hook and loop releasable fastener, a post and string releasable fastener, and a reusable adhesive fastener and a smooth surface to releasably retain said adhesive.

5. The device of claim 1, wherein said first means to permanently retain said pocket includes adhesive material covered with a removable barrier to temporarily shield the adhesive until required.

6. The device of claim 1, wherein said first means to permanently retain said pocket includes adhesive material to enable mounting of the device to the file or document folder.

7. The device of claim 1, wherein said second means to releasably retain said pocket includes one of a hook fastener and a loop fastener, the other of said hook fastener and said loop fastener mounted in said document or file folder.

8. The device of claim 1, wherein said second means to releasably retain said pocket includes a strip attached to the rear wall, the strip having at least one hole for securing the pocket to the document folder with a clasp or prong.

9. The device in claim 1, wherein said flap is hingedly connected to said top edge, said hinge comprising a crease in said flap to permit movement thereof between said open position and said closed position.

10. The device of claim 2, wherein said flap is hingedly connected to said top edge, said hinge comprising a pliant or fibrous material attached to said rear wall and said flap.

11. A device for storing a data storage disk in a document or file folder, comprising:

a front wall having an inner surface and an outer surface;

a rear wall having inner and outer surfaces and a bottom edge connected to a bottom edge of the front wall so that said inner surface of the front wall and said inner surface of the rear wall form a pocket for the disk;

means attaching side edges of said front wall to said back wall whereby said pocket is closed on three edges;

a flap hingedly connected along a first edge to a top edge of the rear wall, and having a second edge opposite said first edge extending over the open edge of said pocket, said flap being movable from an open position allowing the disk to be inserted into said pocket through the open edge thereof and a closed position at least partially covering said open edge of said pocket; and means for retaining said pocket in a document or file folder disposed on said rear wall, said means for retaining including a first means to permanently retain said pocket in said document or file folder and second means for releasably retaining said pocket in a document or file folder.

12. The device of claim 11, wherein said flap and said front wall have means for releasably securing said flap in a closed position against the outer surface of said front wall.

13. The device of claim 11, wherein said side edges include at least one pleat so as to allow movement of the first and second walls away from one another during insertion or removal of the disk through the opening.

14. The device of claim 12, wherein said releasable securing means is selected from the group consisting of hook and loop, reusable adhesive, and post and string.

15. The device of claim 11, wherein said first means to permanently retain said pocket includes adhesive material to enable mounting of the device to said document or file folder.

16. The device of claim 11, wherein said first means for retaining includes adhesive material to permanently attach the pocket to a document or file holder and said second means includes a strip attached to the rear wall having at least one hole therein for releasably attaching the pocket to said document or file folder.

* * * * *